United States Patent [19]

Nolan et al.

[11] Patent Number: 4,637,427
[45] Date of Patent: Jan. 20, 1987

[54] MAGNETIC VALVE

[76] Inventors: John H. Nolan; William A. Nolan, both of 234 SW. 12th Ave., Deerfield Beach, Fla. 33441

[21] Appl. No.: 739,362

[22] Filed: May 30, 1985

Related U.S. Application Data

[63] Continuation-in-part of Ser. No. 531,848, Sep. 14, 1983, abandoned.

[51] Int. Cl.[4] .............................................. F16K 17/28
[52] U.S. Cl. .................................... 137/460; 137/462; 137/498; 251/65
[58] Field of Search ....................... 137/460, 462, 528; 251/65, 129, 130, 141

[56] References Cited

U.S. PATENT DOCUMENTS

| | | | |
|---|---|---|---|
| 2,569,316 | 9/1951 | Jerman | 251/65 X |
| 3,200,214 | 8/1965 | Aubert | 251/65 X |
| 3,360,007 | 12/1967 | Haidek | 251/65 X |
| 3,683,957 | 8/1972 | Sands | 137/460 |
| 4,210,174 | 7/1980 | Eross | 137/528 |
| 4,360,038 | 11/1982 | Trinkwalder | 251/65 X |

FOREIGN PATENT DOCUMENTS 2249598 5/1973 Fed. Rep. of Germany ...... 137/460
23149 of 1912 United Kingdom ................ 137/460

*Primary Examiner*—Harold W. Weakley
*Attorney, Agent, or Firm*—Melvin K. Silverman

[57] ABSTRACT

There is disclosed a reset mechanism particularly adapted for use within a magnet valve in which the reset mechanism comprises a passageway within the valve housing connecting the inlet and outlet passages in which a reset valve normally interrupts a communication between the inlet and outlet side of the said reset passage to permit normal operation of the magnetic valve and to permit normal fluid flow through the inlet and outlet passages thereof prior to movement of said magnetic valve from its normally open to its normally closed position. After said magnetic valve has closed, this being responsive to a pre-determined excess of fluid pressure across the primary communication area between the inlet and outlet passages of the magnetic valve, the reset valve can be actuated to open the reset passage thereby creating an equalization of pressure between the outlet and inlet ports, thus eliminating the existence of any relative vacuum across the area of primary communication between the inlet and outlet passages and, thereby, eliminating any opposition to the return of the magnetic valve to its normally open position.

2 Claims, 3 Drawing Figures

MAGNETIC VALVE

REFERENCE TO RELATED APPLICATION

This case is a continuation-in-part of Ser. No. 531,848, filed Sept. 14, 1983, now abandoned.

BACKGROUND OF THE INVENTION

This invention relates to magnetic valves and, more particularly, to an improvement in magnetic valves that will insure the return of the valve to a normally open position after the condition causing the closing of the valve has ceased to exist.

Magnetic valves have been long known in the art and, in particular, are exemplified by such patents as U.S. Pat. No. 3,200,214 to Aubert; U.S. Pat. No. 2,869,563 to Schoengrun; and U.S. Pat. No. 3,360,107 to Haidek.

With respect to the use of pressure equalization in order to accomplish a reset function, prior art known to the Inventor is reflected in U.S. Pat. No. 3,683,957 to Sands; U.S. Pat. No. 4,067,359 to Kwast; and U.S. Pat. No. 4,245,813 to Grenier. None of these patents reflect the structure or function of the invention herein.

The present invention may be viewed as an improvement of said patent to Aubert in which the structure of Aubert is provided with a reset capacity which will assure the desired return of such a magnetic valve to its normal position after an excess of fluid pressure has ceased to exist. A novel calibration means for the valve of Aubert is also disclosed.

SUMMARY OF THE INVENTION

The present invention comprises a reset mechanism particularly adapted for use within a magnetic valve in which the reset mechanism comprises a passageway within the valve housing connecting the inlet and outlet passages in which a reset valve normally interrupts a communication between the inlet and outlet side of the said reset passage in order to permit normal operation of the magnetic valve and to permit normal fluid flow through the inlet and outlet passages thereof prior to movement of said magnetic valve from its normally open to normally closed position. After said magnetic valve has closed, this being responsive to a pre-determined excess of fluid pressure across the communication area between the inlet and outlet passages of the magnetic valve, the reset valve can be actuated in order to open the reset passage thereby creating an equalization of pressure between the outlet and inlet ports, thus eliminating the existence of any relative vacuum across the area of communication between the inlet and outlet passages and, thereby, eliminating any opposition to the return of the magnetic valve to its normally open position.

It is the principal object of the present invention to provide a reset mechanism particularly useful in connection with magnetic valves.

It is a further object to provide a reset mechanism operable through principles of pressure equalization that will assure the return of the valve in a magnetic, flow-controlled device to its normally open position.

It is a still further object of the present invention to provide a reset mechanism which will assure the desired sequence of opening, closing, and reopening of a magnetic valve responsive to pre-selected levels of fluid pressure between inlet and outlet passageways.

The above and yet further objects and advantages of the present invention will become apparent from the hereinafter set forth Detailed Description of the Invention, the Drawings, and appended Claims.

DETAILED DESCRIPTION OF THE INVENTION

Figure 1:
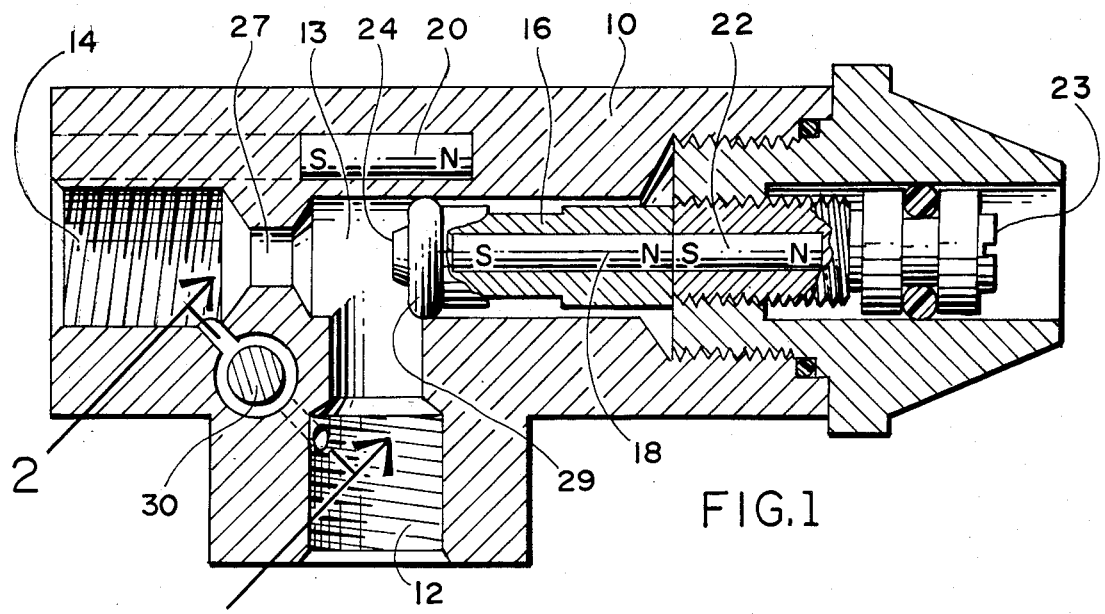
FIG. 1 is a sectional view of a magnetic valve including the present inventive reset means, showing the valve in a normally open position.

With reference to FIG. 1, there is shown a fluid control device in the nature of a magnetic valve. This valve includes a housing 10 having an inlet port 12 communicating, through an area 13, with an outlet port 14. Also provided is a moveable piston valve 16 normally permitting communication through area 13 between said ports 12 and 14. The valve 16 is magnetically biased by piston pole magnet 18 in which, in a preferred embodiment, the south pole is disposed to the left of the valve 16 and the north pole is disposed to the right thereof. A fixed pole magnet 20 and a control pole magnet 22 are disposed within the housing 10 in order to exert a magnetic influence upon the valve 16 to maintain said valve in an open position. The axial position of piston valve 16 within housing 10 is controlled through a control screw 23 (described below in further detail).

The piston valve 16 is capable of displacement in opposition to the magnetic attraction between piston magnet 18 on the one hand, and said magnets 20 and 22 on the other hand. When an excess flow occurs across the area 13 of communication between the ports 12 and 14, an enhanced relative vacuum in said area 13 is created, thereby creating a pull against the surface 24 of the valve 16. When the fluid pressure across the communication area 13 exceeds a pre-determined level, the relative vacuum created thereby will overcome the magnetic attraction between the piston magnet 18 and the magnets 20 and 22. The piston valve 16 then moves toward the outlet port 14 with an ever increasing differential until it comes to rest on the valve seat 27, thereby stopping the fluid flow, and sealing the fluid flow with O-ring 29. The seat of the piston valve 16 is particularly adapted to mate with the O-ring 29 to thereby create a so-called positive seal closure which will continue to exist so long as any pressure differential whatsoever continues to exist between the ports 12 and 14.

When pressures are equalized within the area 13 and on the surface 24 of the piston valve 16, the pole magnet 20 will repel the piston valve 16 in the direction of the control magnet 22 eventually effectuating contact between the respective opposite north and south poles of the piston magnet 18 and the control magnet 22, thus completely opening the communication area 13 between the inlet 12 and outlet 14.

Figure 2:
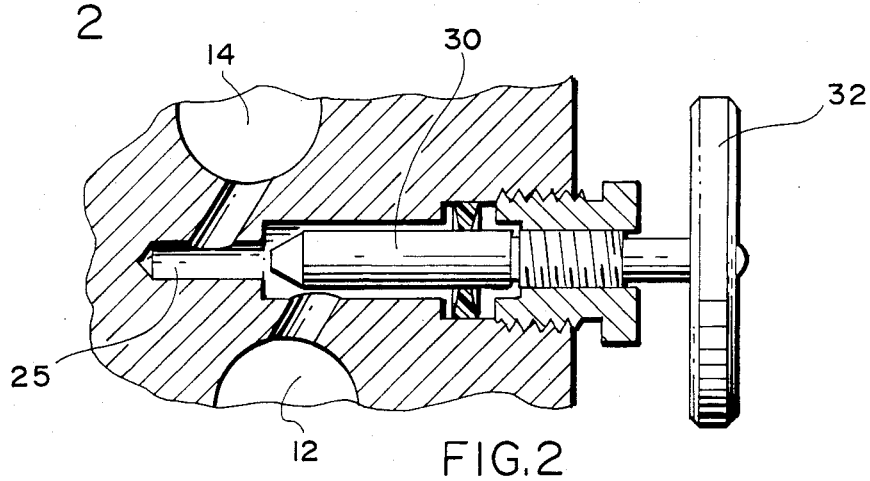
FIG. 2 is a sectional view taken along line 2—2 of FIG. 1, illustrating in further detail the configuration of the reset passage.
Figure 3:
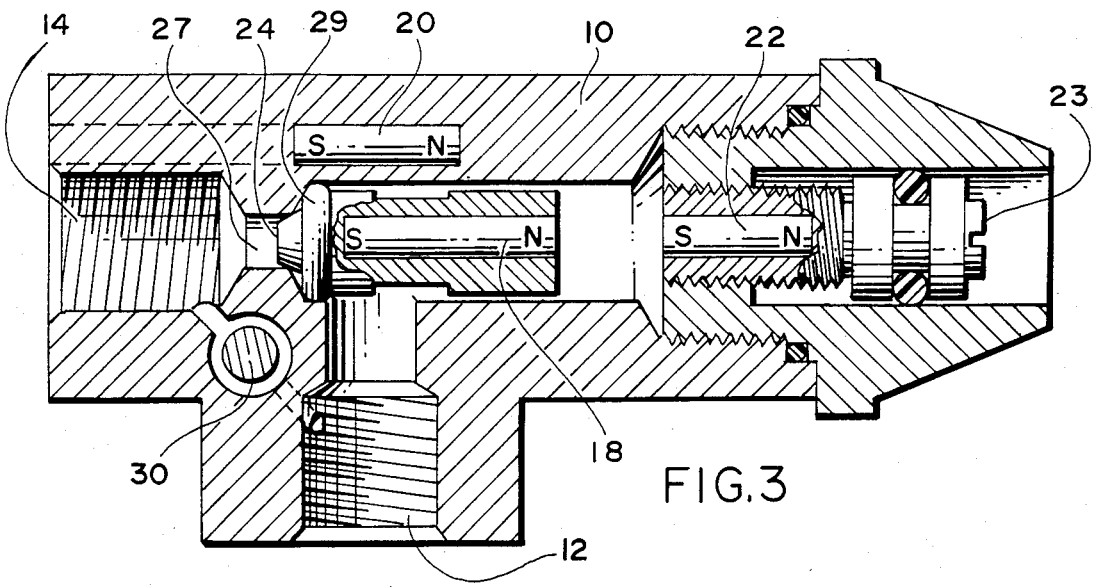
FIG. 3 is a sectional view showing the magnetic valve in normally closed position.

The above described re-opening of the piston valve 16 following a pre-selected decrease of pressure on the surface 24 has, in practice, been difficult to achieve in that a pressure differential between inlet port 12 and outlet port 14 often has a tendency to continue to exist, notwithstanding the elimination of the original excess of the fluid pressure that caused the piston valve 16 to initially displace to the left, closing the communication area 13. Experimentation has found that the return of the piston valve 16 to its normally open position can be insured only if the pressure differential between the inlet port 12 and outlet port 14 is equalized. The improvement of the present invention accomplishes this objective through the provision of a pressure equalization or reset passage 25 which creates a fluid communication between inlet port 12 and outlet port 14 (see FIGS. 1 through 3). The reset channel 25 includes an inlet side 26 and an outlet side 28. As shown in FIG. 2, the reset channel is provided with a zig-zag configuration that is adapted for the receipt of a reset valve 30 having an actuation means 32. As noted in FIG. 2, the reset valve 30 is normally in a position that will preclude fluid communication between the inlet side 12 and outlet side 14 of the reset channel 25. Therefore, in normal operation, the reset valve 30 will be closed thereby eliminating the reset passage 25 from the fluid system of the magnetic valve.

In those situations where the return of the piston valve 16 to its normally open position, following a closure of the valve 16, is a problem, use is made of actuation means of 32 (or any electromechanical equivalent thereof) to open reset (pressure equalization) passage 35 thereby immediately causing equalization of pressure between the inlet 12 and outlet 14, thus eliminating the existence of any relative vacuum within the communication area 13. Upon the elimination of the relative vacuum within area 13, and against face 24, piston magnet 18 and the fixed pole magnet 20 will immediatedly be repelled and the piston magnet will be attracted to the control magnet 22, thereby returning the piston valve to its normal open position.

It may thusly be appreciated that the resetting of the magnetic piston valve may be readily achieved through the provision of a pressure equalization channel in order to insure the elimination of relative vacuum against the "sensing" face 24 of the piston valve to permit the natural magnetic repulsion of the magnetic valve to return the piston thereof to its normally open position. It is also to be appreciated that applications will exist in which the position of the piston valve is that of normally closed, as opposed to normally open. However, the use of a pressure equalization passage to accomplish selective resetting of such a valve will be equally applicable in the case of such a normally closed magnetic valve.

A further feature of the present invention which serves to increase its precision and range of application is the use of the control magnet 22, actuated by control screw 23, to regulate the pressure differential or relative vacuum within area 13 that will give rise to closure of the piston valve 16. In particular, control screw 23 can be used to adjust the point of longitudinal contact of control magnet 22 against the co-axial piston magnet 18 within housing 10. Thereby, the closer the contact point of control magnet 22 against piston magnet 18 is advanced toward area 13 the stronger will be the magnetic force exerted by the pole magnet 20 against the piston magnet 18 and the lesser the pressure differential in area 13 needed for actuation. Conversely, the further the contact point is disposed from the pole magnet 20, the weaker will be the magnetic force between said magnets 18 and 20 and, thusly, the greater will be the pressure differential between port 12 and port 14 necessary to actuate the piston valve 16. Further, the changing of the axial position of sensing face 24 within area 13 (the result of rotating control screw 23) will alter the flow geometry within the area 13 of inlet-outlet communication, thereby changing and calibrating the level of fluid pressure across said inlet-outlet area 13 at which actuation and re-set of said piston valve 16 will occur.

Thereby, the reliability of the function of the open and reset modes of the piston valve 16 are enhanced by the position and function of said fixed pole magnet 26 and, further, the re-setting of said piston valve to its normally open position after the initially actuating excess of fluid pressure has ceased to exist, may be insured by the opening of said moveable re-set valve 30 to thereby permit communication between the inlet and outlet sides of said re-set passage 25, thereby creating an equalization of pressure between said inlet and outlet ports 12 and 14, thus reducing to zero the pressure differential across the region of communication between said inlet and outlet ports by eliminating any residual relative vacuum pressure upon the sensing face 24 of the piston valve, that might otherwise prevent the prompt return of the piston valve to its normal open position.

While there have been herein shown and described the preferred embodiments of the present invention, it is to be understood that the invention may be embodied, otherwise than as herein illustrated and described that within said embodiment, certain changes in the detail and construction, and in the form and arrangement of the parts, may be made without departing from the underlying ideas or principles of this invention, within the scope of the appended Claims.

Having thus described our invention, what we claim as new, useful, and non-obvious and, accordingly, secure by Letters Patent of the United States, is:

1. A fluid control valve with re-set mechanism, the valve including a housing, a fluid inlet passage therein, and a fluid outlet passage in communication with said fluid inlet passage, said fluid control device comprising:
 (a) a re-set channel formed in said housing, connecting said fluid inlet and outlet passages;
 (b) an externally movable re-set valve normally blocking said re-set channel;
 (c) a reciprocating valve capable of permitting, limiting, or precluding communication between said inlet and outlet passages, said valve comprising a ferromagnetic armature defining a magnetic axis along its axis of reciprocation, said magnetic axis generally corresponding to the longitudinal center of a fluid-tight chamber within said housing within which said valve may reciprocate, said valve having a variable flow-responsive integral first radial end face disposed within a region of communication between said inlet and outlet passages, said outlet passage having an entrance geometry complemental to the geometry of said first end face;
 (d) a fixed pole magnet disposed within said housing and magnetically proximate to said area of communication between the inlet and outlet passages, said fixed pole magnet having a magnetic axis disposed in magnetic communication with the magnetic axis of said valve, to normally attract and hold said valve when said valve is open, and to normally repel said reciprocating valve toward its open direction when said valve is closed; and
 (e) magnetic bias and calibration means disposed within said housing and disposed co-linearly and normally in contact with said reciprocating valve, near a radial end thereof opposite to said flow-responsive radial end of said valve, said bias and calibration means provided with an axis of magnetic polarity substantially co-linear with said magnetic axis of said reciprocating valve, in which said reciprocating valve is normally magnetically and thereby mechanically balanced between (i) the force of magnetic attraction, at said first radial end face, between said end of said reciprocating valve and that end of said fixed pole magnet proximate thereto, and (ii) the force of the magnetic contact of said bias and calibration means against said opposite radial end face of said reciprocating valve, said bias and calibration means further comprising external means for selectably advancing said flow-responsive first radial end face partially into said region of inlet-outlet communication to thereby correspondingly calibrate the level of fluid flow necessary to overcome the magnetic co-action between said bias and calibration means, and said reciprocating valve, to thereby precisely regulate the closure thereof, whereby the reliability of the function of the open and re-set condition of the reciprocating valve is enhanced by the position and function of said fixed pole magnet and, further whereby, the resetting of said valve to its normally open position after an excess of fluid pressure has ceased to exist, may be insured by the opening of said externally moveable re-set valve to thereby permit communication between the inlet and outlet passages of said re-set channel, thereby creating an equalization of pressure between said inlet and outlet passages, thus reducing to zero the pressure differential across the region of communication between said inlet and outlet passages, by eliminating any residual relative vacuum pressure upon the port face of the reciprocating valve that might otherwise prevent the prompt return of the valve to its normally open position.

2. The valve as recited in claim 1 in which said port face of said reciprocating valve further comprises sealing means for accomplishing a fluid-type nesting of said port face against said complemental geometry of the entrace to said outlet passage during closure of said valve.

* * * * *